United States Patent [19]

Levine

[11] 4,083,007
[45] Apr. 4, 1978

[54] RADAR TRANSMITTER TEMPORAL NOISE REDUCTION SYSTEM

[75] Inventor: Arnold M. Levine, Chatsworth, Calif.

[73] Assignee: International Telephone and Telegraph Corporation, New York, N.Y.

[21] Appl. No.: 724,278

[22] Filed: Sep. 20, 1976

[51] Int. Cl.² .............................................. H03K 13/02
[52] U.S. Cl. ................................ 325/159; 343/17.1 R; 325/141
[58] Field of Search ................. 325/164, 141, 159, 41, 325/42; 343/17.1 R, 5 R, 229

[56] References Cited

U.S. PATENT DOCUMENTS

| | | | |
|---|---|---|---|
| 2,510,054 | 6/1950 | Alexander et al. .................. | 325/141 |
| 3,736,589 | 5/1973 | Rambo .............................. | 343/171 R |
| 3,947,674 | 3/1976 | Gutleber ........................... | 343/17.1 R |

Primary Examiner—Robert L. Griffin
Assistant Examiner—Tommy P. Chin
Attorney, Agent, or Firm—William T. O'Neil

[57] ABSTRACT

A pulsed radio-frequency transmitter-modulator system including circuits for converting a sample of the transmitter-radio frequency pulse to a corresponding video pulse and comparing this to the standardized timing pulse of the system to develop a control signal as a function of the leading edge delay and pulse duration of the RF pulse compared to the system timing pulse. The control signal is applied in a type of feedback loop including circuits responsive thereto for adjusting the pulse position and duration between the system timing pulse generator and the modulator of the pulse transmitter. The principal purpose is relief from the effects of temporal noise and the resulting improved performance of moving target indicator circuits associated therewith.

10 Claims, 3 Drawing Figures

RADAR TRANSMITTER TEMPORAL NOISE REDUCTION SYSTEM

BACKGROUND OF THE INVENTION

1. Field of the Invention

The invention relates generally to pulsed radio-frequency transmitting systems and more particularly, to such systems as they apply in the radar arts.

2. Description of the Prior Art

Along with the trend toward higher powered pulsed-radar transmitters, there has also been a need for improved performance of associated MTI (moving target indicator) systems. Among the factors which tend to degrade MTI performance is the transmitter output noise figure. Temporal noise, in particular, is a significant problem in respect MTI performance. This temporal noise manifests itself as variation in the timing of the leading edge ("jitter") of the transmitter RF pulse and to some extent, also the variation of pulsewidth or duration.

The usual radar transmitter includes a pulse modulator of high power capability and an RF generator which operates on a pulsed basis in response thereto. The high-power modulator is supplied from a high-power, rectifier-filter arrangement and sometimes through an electronic regulator circuit. The presence of power supply ripple is a significant cause of the aforementioned temporal noise. Aging of the RF generator itself can introduce temporal noise of a long-term type, however, this has little perceptible effect on MTI performance because it occurs over a relatively long time base, except to the extent that aging may increase sensitivity to power supply ripple. Certain other instabilities in addition to power supply ripple also contribute to the short-term temporal noise which, it is desired, be greatly reduced for the provision of a "stiffer" transmitter RF pulse.

The use of elaborate power supply filtering and regulation is, of course, possible, and does have a beneficial effect, however the adequate filtering and regulation of such a relatively high-powered source is of itself, quite expensive.

The manner in which the combination of the present invention operates to greatly ameliorate the temporal noise problem as aforementioned will be understood as this description proceeds.

SUMMARY OF THE INVENTION

It may be said to have been the general objective of the present invention to reduce temporal noise components extent in the output of the pulsed RF generator without resorting to very expensive filtering and power supply regulation. In fact, through use of the device of the present invention, a lower cost power supply design is possible because of relaxation of regulation requirements and the requirement for very low power supply ripple content, which thereby become possible.

In its most basic terms, the combination of the present invention involves circuitry for sampling the transmitter output pulse, detecting and limiting this pulse and comparing it with the system timing pulse in standardized form. Actually, the comparison may involve merely a logical AND circuit and a low-pass filter. The control signal thus generated is applied to a circuit arrangement for varying the timing of an initiating pulse derived from a pre-trigger pulse synchronous with the system timing pulse aforementioned. The arrangement is akin (in effect) to applying negative feedback to an amplifier for hum and noise reduction. The feedback response is slow compared to the frequencies represented in a transmitted pulse (pulse width ranging from a fraction of a microsecond to several microseconds), but rapid compared to the ripple frequencies which produce the temporal noise to be minimized. The low-pass filter circuit constants mainly determine this response characteristic.

The so-called position-controlled initiating pulse thus has its leading edge time stabilized, and following that circuitry, a pulse width control circuit is also controlled by the control signal hereinbefore described. Accordingly, a very substantial degree of transmitter pulse leading edge stabilization and also stabilization of the transmitted pulse duration are effected.

The details of the manner in which the novel apparatus of the invention may be implemented will be evident as this description proceeds.

DESCRIPTION OF THE PREFERRED EMBODIMENT

Figure 1:
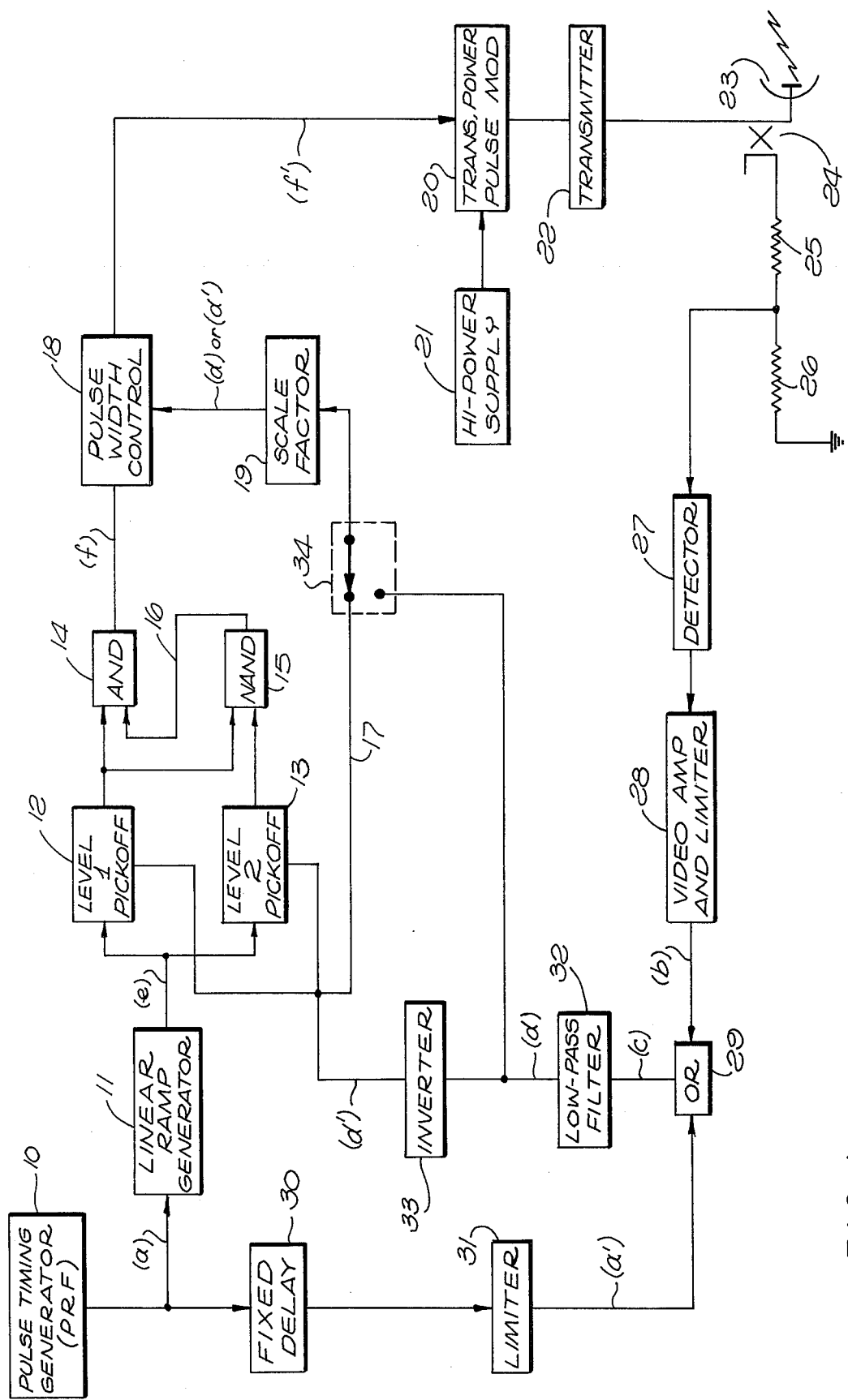
FIG. 1 is a schematic block diagram of an overall device according to the invention.

Referring now to FIG. 1, taken in conjunction with FIG. 3, a typical implementation of the invention will be described with reference to the pertinent waveforms illustrated in FIG. 3.

The timing pulse generator 10 provides a uniform train of pulses at the PRF (pulse repetition frequency) of the system as is well understood in this art. The output of 10 is available directly as waveforms (a) of FIG. 3, and through fixed delay 30 as waveform (a'). Thus the waveform (a) becomes a pre-trigger used to initiate the ramp generator 11 for the purpose of producing waveform (e) at the output of ramp generator 11. It will be seen from FIG. 3 that the waveform (a) constitutes a pre-trigger necessary in order to pre-start the ramp (e). This will be more fully described hereinafter.

The output of fixed delay 30, i.e, (a') is fed to a limiter 31, the output of which is thereby standardized as is the waveform (b) provided through the video amplifier and limiter 28. This waveform (b) is the detected and limited radio frequency pulse of the transmitter 22 sampled by a coupler 24 and suitably fractionated by a divider comprising 25 and 26. Detection in 27 reduces the RF pulse to the video domain, which pulse is the subsequently amplified and limited waveform (b).

The effective comparison of waveforms (a') and (b) in the OR circuit 29 produces the waveform (c) which is the same amplitude as (a') and (b) but begins at the leading edge of the (a') waveform and terminates at the trailing edge of the (b) waveform. (Note that there will always be some inherent delay between (a') and the transmitted pulse in equipment of this type). The OR circuit 29 does not thereby add amplitudes during the overlap of its two input waveforms but rather may be said to produce a waveform which is the temporal sum of the two, minus the time of overlap.

Passing on through low-pass filter 32 the integrated signal (*d*) is obtained and its inverted form (*d'*) is provided through the inverter 33.

Figure 3:
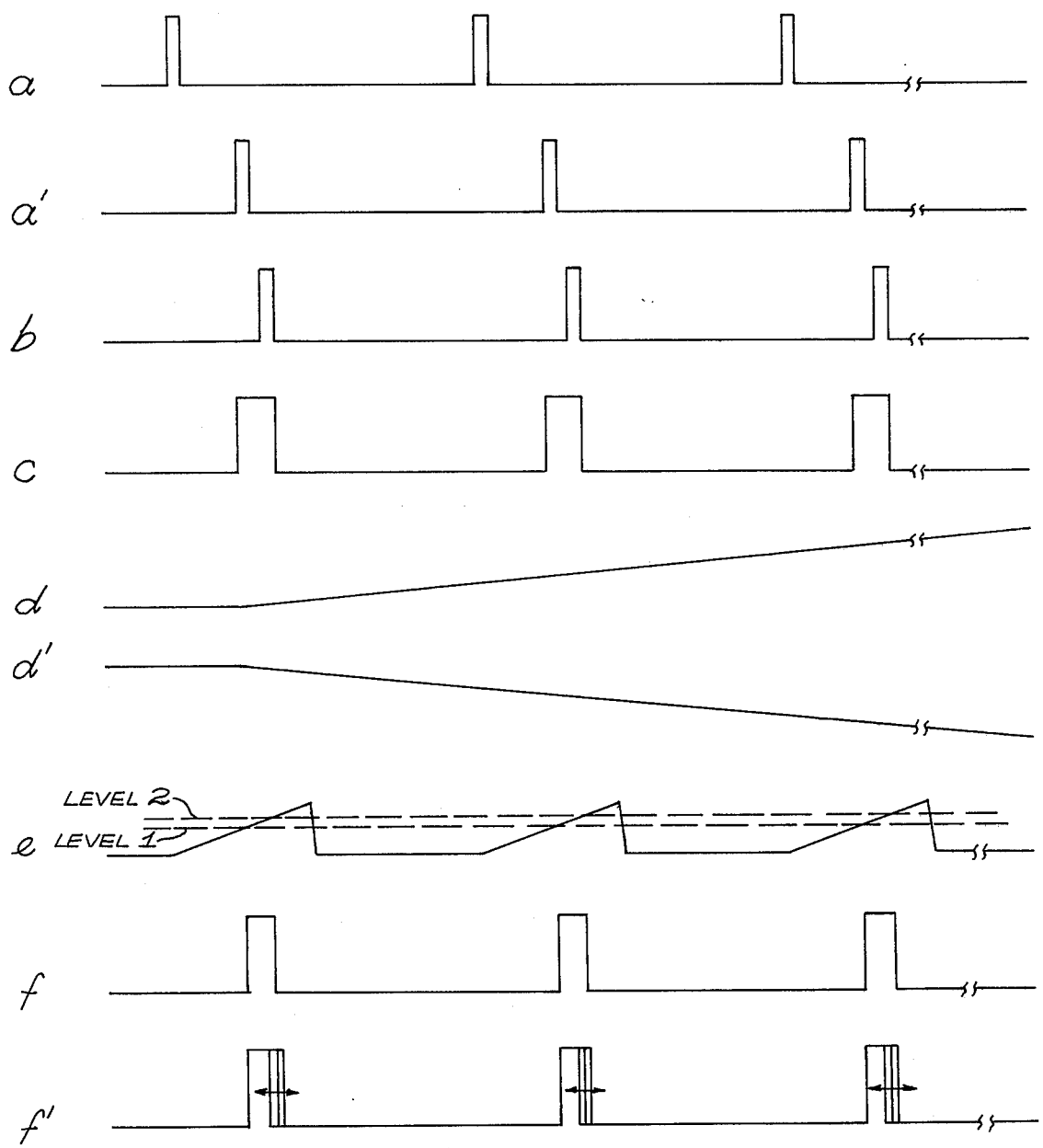
FIG. 3 depicts key waveforms at various points in the circuit of FIG. 1, these being identified as (a) through (f).

Returning now to the ramp generator 11 and the waveform (*e*), it will be noted that on FIG. 3, two amplitude levels, marked level 1 and level 2, are depicted. These levels represent the "pick-off" points which are adjusted together up and down as viewed on the (*e*) waveform of FIG. 3, so that their intersections with the linear ramp waveform effectively move along the abscissae of each together. Level pick-offs 12 and 13 corresponding to levels 1 and 2, respectively, are controlled in that respect by the waveform (*d'*) from inverter 33, it being understood that the pick-off threshold of 13 is higher than that of 12. These devices 12 and 13 may be standard pick-off devices such as might be used in oscilloscope sweep devices, etc. They can comprise diode logic devices or may comprise a stable high-gain amplifier with an adjustable threshold so that a step-function output is provided once the threshold is crossed. These step-function outputs represent a square wave jump to a new level continuing throughout the duration of the sawtooth, and corresponding on their leading edges to the level 1 and level 2 time crossovers on the ramp function of FIG. 3(*e*). The circuits 14 and 15 represent a logical combination so that the (*f*) waveform is obtained as an output from AND circuit 14. This output waveform may be thought of as the nominal pulse width to which the transmitter power pulse modulator 20 responds. It will be noted that the output of the pick-off 12 is supplied to both the AND circuit 14 and the NAND circuit 15, whereas the pick-off 13 supplies its output only to NAND circuit 15, which in turn, provides its output 16 as a second input of 14. The operation of this logic combination is very simple, since the AND circuit 14 provides an output only in the presence of a positive signal at both inputs thereof. For this purpose, the step function provided by 12, as the ramp for 11 passes through level 1 FIG. 3 (*e*), is a "YES" or positive signal continuing throughout the duration of the ramp. NAND circuit 15 provides an output immediately on 16 and therefore, the waveform (*f*) is generated at the output of 14. As soon as the step-function from 13 occurs at the second pick-off point on the ramp, 15 has two positive inputs at which time its output switches to zero, therefore for the balance of the ramp function there is no output from 14, that is to say, the pulse (*f*) is terminated, i.e., has its trailing edge established.

In some pulse modulator applications, the power modulator 20 develops a transmitter-modulator pulse substantially of the same duration as the control pulse. In other pulse modulators, the input triggering pulse is useful only for establishing a leading edge, the duration being of little significance. In such systems, the output of 14 might be supplied directly to 20, or in fact, only a single level pick-off in place of 12 and 13 might be employed, the establishment of a pulse leading edge time positionable by the signal (*d'*) being provided.

Many MTI systems rely only on the stability of the transmitted pulse leading edge and are relatively insensitive to variations in the transmitted pulse duration. However, in cases where transmitted pulse duration must also be controlled, a pulse width control circuit 18 is inserted. This circuit takes the signal (*f*) and converts it to (*f'*) as seen on FIG. 3. This pulse is essentially that of (*f*) except that the duration is controllable by a circuit 18. A control signal, low-pass filter in 32 and its inverse as provided by 33, i.e., (*d*) and (*d'*) are shown fed to the selector-switch 34 via lines 17 and 17*a*, respectively. The switch 34 can accordingly select the correct polarity (which need not necessarily be the same as the polarity of the control signal applied to the pick-off 12 and 13). A scale factor 19 provides for the fact that a certain amount of "tracking" between leading edge stabilization and pulse duration control would ordinarily be necessary.

As aforementioned, temporal noise, especially as caused by power supply 21, can affect the time of initiation of the transmitted pulse supplied by 22 to the antenna 23, however, the system of FIG. 1 supplies at least one inverse feedback control loop involving leading edge stabilization and, if desired, also the loop involving pulse width control.

Figure 2:
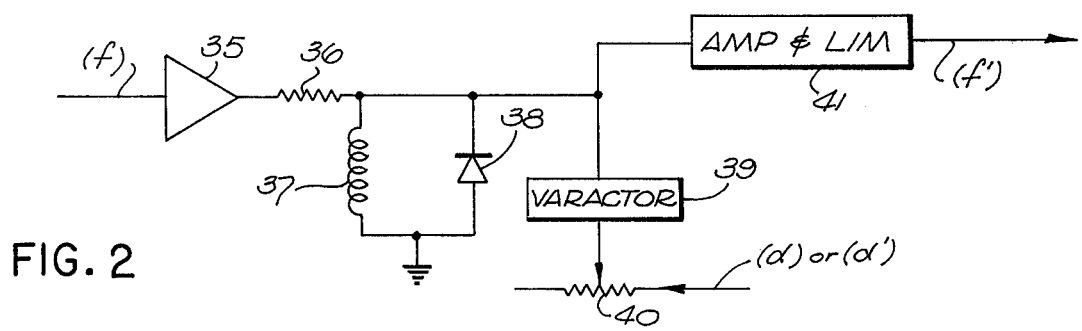
FIG. 2 is a detail of the pulse width control block of FIG. 1.

Referring now to FIG. 2, a detail of the implementation of block 18 will be described.

Receiving the waveform (*f*) from 14 within block 18 is an amplifier 35, an isolating resistor 36 and a tank circuit including inductance 37 and varactor 39. This arrangement may be thought of as a damped wave oscillator. The waveform (*f*) shock excites this tank circuit, which is only permitted essentially one significant positive going oscillation half-cycle because of the unilateral damping action of 38. The scale factor 19 might be as simple as a potentiometer 40 fractionating the control function (*d*) or (*d'*). This control of the varactor 39 operates to control the resonant frequency of the aforementioned tank circuit and therefore, the duration of the positive going half-cycle produced thereby. An amplifier and limiter 41 with threshold clipping (if necessary to discard overshoots and residual damped oscillations) provides the output (*f'*) as depicted on FIG. 3. Thus the (*d*) or (*d'*) control function provides width control of the pulse supplied to the modulator 20, in addition to the leading edge stabilization function hereinbefore described.

Quite obviously, a number of variations and modifications are possible to the detailed circuitry for providing the basic structure and function required. For one example, the function of the pick-offs 14 and 15 can be supplied by diode clamps suitably backed biased. Although possibly less desirable from the point of view of susceptibility to extraneous interferences, multi-vibrator or blocking type circuits can provide the ramp pick-off functions and the pulse width control function.

Many other modifications and variations will suggest themselves to those skilled in this art once the principles of the invention are understood and appreciated. Accordingly, it is not intended that the drawings and this description should be considered as limiting the scope of the invention, these being intended to be typical and illustrative only.

What is claimed is:

1. A pulsed radar transmitting system, including a timing pulse source operating at a predetermined pulse repetition frequency, a pulse modulator controlled by said timing pulse source, a radio frequency transmitter pulsed by said modulator, to produce a corresponding radio frequency pulse and a power supply having ripple frequency components in its output, said power supply being connected as the power source for said pulse modulator, comprising:

first means responsive to said timing pulse source and preceding said pulse modulator for providing a time position controlled initiating pulse to said pulse modulator, said first means being also responsive to a first control signal therefor;

second means for sampling said radio frequency pulse generated by said transmitter and for producing a video pulse substantially in time coincidence with the envelope of said radio frequency pulse;

and third means responsive to said video pulse and said timing pulse for generating said first control signal as a function of the difference of starting time and duration between said video pulse, and for applying said first control signal to said first means in a polarity so as to vary the position of said initiating pulse to tend to compensate for variations in the time of occurrence of said radio frequency pulse.

2. Apparatus according to claim 1 further including fourth means responsive to said initiating pulse and said first control signal for controlling the duration of said initiating pulse as a function of said first control signal.

3. Apparatus according to claim 1 further comprising; a source of pre-triggers each generated synchronously a predetermined amount of time preceding each of said timing pulses, and means within said first means including a ramp generator connected to be synchronously initiated by said pre-triggers, and at least a first pick-off circuit responsive to said first control signal to initiate generation of said initiating pulse beginning at a threshold amplitude determined by said first control signal.

4. Apparatus according to claim 3 in which a second pick-off circuit is provided also responsive to said first control signal and having a threshold of response higher than that of said first pick-off, said second pick-off circuit defining the trailing edge of said initiating pulse, and including logic means responsive to said pick-off circuits for generating said position controlled initiating pulse, said first control signal being applied to control said pick-off thresholds together in fixed relationship such that the time difference between said thesholds determines the duration of said initiating pulse.

5. Apparatus according to claim 4 further including fourth means responsive to said initiating pulse for controlling the duration of said initiating pulse, as a function of a second control signal, and including scale factor means responsive to said first control signal for generating said second control signal to effect proportionality tracking between said first means and said fourth means.

6. Apparatus according to claim 5 in which said fourth means comprises a damped oscillator having a varactor as a capacitive reactance connected therein, said varactor being controlled by said second control signal in a sense tending to stabilize the width of the variable duration initiating pulse provided by said damped oscillator.

7. Apparatus according to claim 6 in which means are included for shaping said variable duration initiating pulse into a relatively rectangular pulse of fixed amplitude.

8. Apparatus according to claim 1 in whch second means comprises means for diverting a relatively small fraction of the radio frequency pulse energy from the output of said transmitter, and in which detector and amplitude limiting means serially responsive to said diverted radio frequency are provided to generate said video pulse in stabilized form.

9. Apparatus according to 8 including means for amplitude stabilizing said timing pulses, and in which said third means comprises a logic circuit and a low-pass filter for generating said first control signal, said logic circuit being responsive to said amplitude stabilized video and timing pulses to provide a comparison pulse beginning at the leading edge of each of said timing pulse and terminating at the trailing edge of each of said video pulses, said comparison pulse being connected to said low-pass filter.

10. Apparatus according to claim 9 in which said low-pass filter is defined as having an upper cut-off frequency high in respect to the undesired temporal noise frequencies and low compared to the frequencies represented in said video pulse.

* * * * *